United States Patent
Racz et al.

(10) Patent No.: US 8,739,151 B1
(45) Date of Patent: May 27, 2014

(54) COMPUTER SYSTEM USING IN-SERVICE SOFTWARE UPGRADE

(71) Applicant: Genetec Inc., St-Laurent (CA)

(72) Inventors: Pierre Racz, Montreal (CA); Vincent Labrecque, Montreal (CA)

(73) Assignee: Genetec Inc., St-Laurent, QC (CA)

( * ) Notice: Subject to any disclaimer, the term of this patent is extended or adjusted under 35 U.S.C. 154(b) by 0 days.

(21) Appl. No.: 13/849,426

(22) Filed: Mar. 22, 2013

Related U.S. Application Data

(60) Provisional application No. 61/789,790, filed on Mar. 15, 2013.

(51) Int. Cl.
G06F 9/44 (2006.01)

(52) U.S. Cl.
USPC ............................ 717/168; 717/170; 717/171

(58) Field of Classification Search
None
See application file for complete search history.

(56) References Cited

U.S. PATENT DOCUMENTS

| | | | |
|---|---|---|---|
| 5,155,837 A | 10/1992 | Liu et al. | |
| 5,274,808 A | 12/1993 | Miyao et al. | |
| 5,359,730 A | 10/1994 | Marron | |
| 5,410,703 A | 4/1995 | Nilsson et al. | |
| 6,070,012 A | 5/2000 | Eitner et al. | |
| 6,154,878 A | 11/2000 | Saboff | |
| 6,385,770 B1 | 5/2002 | Sinander | |
| 6,397,385 B1 | 5/2002 | Kravitz | |
| 6,463,142 B1 | 10/2002 | Kilp | |
| 6,535,924 B1 | 3/2003 | Kwok et al. | |
| 6,823,515 B2 * | 11/2004 | LiVecchi | 718/105 |
| 6,950,878 B2 | 9/2005 | Kwok et al. | |
| 7,065,769 B1 | 6/2006 | Tolopka | |
| 7,373,632 B1 | 5/2008 | Kawaguchi et al. | |
| 7,590,980 B1 | 9/2009 | Clubb et al. | |
| 7,657,899 B2 | 2/2010 | Werner | |
| 7,802,245 B2 * | 9/2010 | Sonnier et al. | 717/171 |
| 7,818,736 B2 | 10/2010 | Appavoo et al. | |
| 7,853,934 B2 | 12/2010 | Partamian | |
| 7,870,537 B2 | 1/2011 | Lopez et al. | |
| 7,930,691 B2 | 4/2011 | Bhattacharya et al. | |
| 8,015,558 B1 * | 9/2011 | Beloussov et al. | 717/168 |
| 8,019,724 B2 * | 9/2011 | Koniki et al. | 707/626 |
| 8,132,165 B2 | 3/2012 | Bhat et al. | |
| 8,146,073 B2 * | 3/2012 | Sinha | 717/170 |
| 8,156,487 B2 * | 4/2012 | Blumfield et al. | 717/172 |
| 8,190,720 B1 | 5/2012 | Yellai et al. | |
| 2001/0018701 A1 * | 8/2001 | LiVecchi | 709/105 |
| 2003/0055926 A1 | 3/2003 | Kwok et al. | |

(Continued)

OTHER PUBLICATIONS

Hicks, M., et al., Dynamic Software Updating, Proceedings of the ACM SIGPLAN 2001 conference on Programming language design and implementation, 2001, pp. 13-23, [retrieved on Jan. 29, 2014], Retrieved from the Internet: <URL:http://dl.acm.org/>.*

(Continued)

*Primary Examiner* — Thuy Dao
*Assistant Examiner* — Geoffrey St Leger
(74) *Attorney, Agent, or Firm* — Anglehart et al.

(57) ABSTRACT

In-service upgrade of software can be achieved efficiently when software modules pass data using message or data queues. The use of data queues facilitates the transition from a software module's old behavior to a new behavior without risking a deadlock or dropped module call. Upgradeable objects connect to process objects that maintain the queues and their state data, and upgrade objects connect to the process objects of their predecessors.

13 Claims, 5 Drawing Sheets

(56) References Cited

U.S. PATENT DOCUMENTS

| | | |
|---|---|---|
| 2003/0176165 A1 | 9/2003 | Gosewehr |
| 2003/0177209 A1 | 9/2003 | Kwok et al. |
| 2003/0191870 A1 | 10/2003 | Duggan |
| 2005/0182763 A1 | 8/2005 | Chang |
| 2005/0198022 A1 | 9/2005 | Chang |
| 2006/0048133 A1* | 3/2006 | Patzachke et al. ............ 717/168 |
| 2006/0059479 A1* | 3/2006 | Tumati .......................... 717/168 |
| 2006/0130038 A1 | 6/2006 | Claussen et al. |
| 2006/0206905 A1 | 9/2006 | Werner |
| 2007/0011655 A1 | 1/2007 | Tumati |
| 2007/0169083 A1 | 7/2007 | Penubolu et al. |
| 2009/0150872 A1 | 6/2009 | Russell et al. |
| 2009/0249367 A1* | 10/2009 | Koniki et al. ................. 719/328 |
| 2010/0070964 A1* | 3/2010 | Blumfield et al. ............ 717/172 |
| 2012/0102482 A1* | 4/2012 | Wu et al. ....................... 717/172 |
| 2012/0260011 A1* | 10/2012 | Flatland et al. ................ 710/53 |

OTHER PUBLICATIONS

Yu, L., et al., A Framework for Live Software Upgrade, Proceedings of the 13th International Symposium on Software Reliability Engineering, 2002, pp. 149-158, [retrieved on Jan. 29, 2014], Retrieved from the Internet: <URL:http://ieeexplore.ieee.org/>.*

N. Feng et al., Dynamic Evolution of Network Management Software by Software Hot-Swapping, In Proc. of the Seventh IFIP/IEEE International Symposium on Integrated Network Management (IM 2001), Seattle, May 14-18, 2001, pp. 63-76, 2001.

Ning Feng, S-Module Design for Software Hot Swapping Technology, Technical Report SCE-99-04, Systems and Computer Engineering, Carleton University, Ottawa, Canada, Jun. 1999.

\* cited by examiner

COMPUTER SYSTEM USING IN-SERVICE SOFTWARE UPGRADE

TECHNICAL FIELD

This patent application relates to in-service software upgrades in computer systems.

BACKGROUND

Hot swapping or in-service upgrades of computer software has been a topic of interest for many years. For many applications and operating systems, an upgrade is done by stopping the computer program, installing the upgrade, and then restarting the program. In some cases, the operating system also needs to be restarted.

In some contexts, stopping the software is highly undesirable. For example, in a telephone network switch that is handling calls, such stopping and starting of the software would cause the calls to be dropped.

Various solutions have been proposed and implemented, for example, duplicate telephone switch software including the desired upgrade is launched, and new calls are handled by the upgraded software. When all old calls handled by the pre-upgrade software naturally end, the pre-upgrade version of the software is shut down, leaving only the upgraded software to handle calls. This is essentially a type of hot migration, with the software upgrade process itself involving regular installation methods that include stopping and restarting the program.

Some solutions are similar to the previously described solution, except that calls, or any other transactions or processes handled by the software, are moved from the pre-upgrade software to the upgraded software during calls or transactions. This can result in an audible click or pause in the case of call, or in the case of other transactions or processes, some delay, dropped frame or other disturbance that should normally not be fatal to the call or process underway.

In applications where in-service upgrade of software is important, reliability is likewise very important. Reliability is measured by the operational or "up-time" of a system. Up-time of 99.99% means about 53 minutes a year of down time, 99.999% means about 5 minutes a year of down time, 99.9999% means less than a minute a year of down time, and 99.99999% means less than 3 seconds a year of down time. For some applications, achieving 6 nines or higher is essential. Efficient in-service upgrade capability is important to reduce down time due to upgrades.

In-service upgrade of software that does not interfere with the normal operation of the software has also been proposed. For example, the Erlang programming language supports hot-swapping of code, and was released as open-source in 1998. The master's thesis by Ning Feng titled "S-Module Design for Software Hot-Swapping", dated Nov. 25, 1999 (Ottawa-Carleton Institute for Electrical and Computer Engineering, Faculty of Engineering, Department of Systems and Computer Engineering, Carleton University) describes in-service upgrade of software modules. Three different approaches to in-service upgrade of software modules are presented in the thesis. As described, hot swapping of a software module is a difficult task that is done only when the software module is in a state that permits swapping.

For in-service upgrade of software, reliable and efficient implementation is not assured by any programming language or hot-swapping technique. Deadlocks, upgrade time and managing upgrade of multiple software modules at the same time are still problems with in-service upgrade of software.

SUMMARY

Applicants have found that in-service upgrade of software can be achieved efficiently when software modules pass data using message or data queues. The use of data queues facilitates the transition from a software modules old behavior to a new behavior without risking a deadlock or dropped module call. Upgradeable objects can connect to process objects that maintain the queues and their state data, and upgrade objects can connect to the process objects of their predecessors.

Applicants have also found that the use of strongly-typed objects reduces the possibility of errors when performing an in-service upgrade of an object. By using "strongly-typed" data or objects, one goal is to resolve errors that could arise when performing an upgrade of an agent object due to data type mismatch at compile time, rather than at run time. This can effectively prevent putting into service an upgrade that would be incompatible. It will be appreciated that the use of strongly-typed data or objects is preferred but not a requirement.

A software agent can be understood in the state of the art to mean a variety of structures and associated functions. In this application, embodiments are described as using agents. This is because most agent structures provide an efficient way to implement those embodiments. For that reason, "agent" as used in this application is not intended to mean all of the structures and associated functions of commonly implemented software agents known in the art, but instead the minimum structure and function that permits an interface object to be connected to other objects of a computer program while allowing an upgradeable object to be connected and to be disconnected from the interface object at runtime without disrupting the computer program's operation during the upgrade process. This runtime connection control among objects, as will be appreciated by the description below, is found in some conventional software agents. In this way, an agent can be subjected to an in-service upgrade with a change in its behavior or program function, while not adversely affecting the execution of a remainder of a computer program connected to the agent.

The upgrade object can read the state data of the original or previous upgradeable object when initializing, or it may access and use the state data used by the original object as its own. In the latter case, the state data can conveniently be stored as data of the interface object. Alternatively, a separate object can be designated to store the state data, as long as the upgradeable object can connect and disconnect from the object containing the state data during the upgrade process. When the upgrade requires a change in state data structure, the initialization of the upgrade object involves restructuring the state data.

In some embodiments, a method for performing in-service software upgrade in a computer comprises providing an original agent object linked to a process object that manages an input queue, an output queue and state data for the agent object. Software is executed in the computer that interfaces with the original agent object using the queues of the process object. The original agent object has an original behavior using the process object acting on data from the input queue and the state data, and provides output to the output queue while updating the state data. The method comprises creating an upgrade agent object to replace the original object with an upgraded behavior, and the upgrade object is adapted to use the process object. The upgrade agent object is installed without suspending execution of the computer program. When the original agent object is idle, the in-service upgrade is done by causing the process agent to suspend reading data from the queues, adjusting the state data, if required, to take into account any changes in data due to the upgrade agent object, causing the upgrade agent object to be linked to the process object and disconnecting the original agent object from the process object. Operation of the process object and execution of the upgrade agent object can then resume/start.

Applicants have also found that in-service upgrade of software is a tool to be used to improve system reliability by using in-service upgrade of software to temporarily deploy error traps, tracing or other debugging or quality monitoring tools, so that an upgrade can be defined to improve reliability of a system.

BRIEF DESCRIPTION OF THE DRAWINGS

The invention will be better understood by way of the following detailed description of embodiments of the invention with reference to the appended drawings, in which.

DETAILED DESCRIPTION

Figure 1:
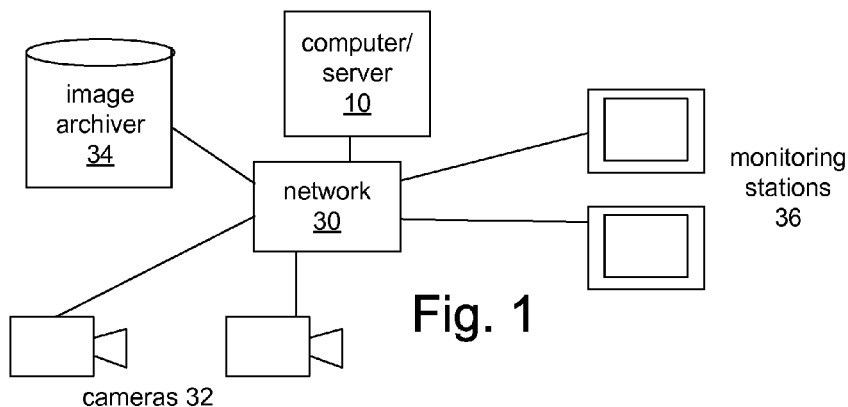
FIG. 1 is a schematic block diagram of a video management software (VMS) system network.

One environment in which an in-service upgrade is important is a video management software system as illustrated schematically in FIG. 1. Such a system is common in the surveillance industry, and can involve a complex network with many thousands of cameras, card readers and other input/output devices. In some cases, the system is located at a single geographic location, while in others, it can extend across cities and continents.

Users at monitoring stations 36 can request access to video from cameras 32 over network 30. A server 10 handles such requests and provides the requested video when the user is so authorized. The server 10 also ensures that video from the cameras is archived at a video archival server 34. In a surveillance application, it is important that the video streams being monitored are available without fail, so that users can maintain surveillance without interruption.

When the computer software 10 is in need of an upgrade, two options are conventionally made available. A first is to schedule a brief shut down of the whole system, so that the software 10 can be upgraded. The second option is to set up a second server running the upgraded software in parallel, and to migrate users from the old software to the new software over a period of time, for example, by requesting users to log off and to log back in as soon as is convenient for the user. When all user sessions are running on the new server software, the old server software can be shut down and removed from service. This is a type of migration of users between servers.

In the following embodiments, a different approach is provided. The software architecture of the computer software 10 provides upgradeable objects that are "wrapped" using an interface object, called hereinbelow a process, that allows a remainder of the computer program to connect to the upgradeable object through a queue of the process. This allows the upgrade process to happen whenever the upgradeable object is idle without concern for the state of the rest of the computer program, because the upgradeable object appears available to the rest of the computer program during the upgrade because the input queue of the process remains available.

In some embodiments, the computer program makes use of dynamically created objects or agents, and the tools used to dynamically create such objects or agents are also used to create an upgrade agent that uses the existing process of the original or former agent being upgraded.

The server or computer 10 can be a conventional computer using any one of a variety of operating systems, a non-limiting example of which can be Microsoft Windows, Apple Macintosh, Linux and Google Android. Preferably, the operating system is multitasking. In some embodiments, the framework used has scheduling capabilities, so that objects can influence thread management within the software.

Figure 2:
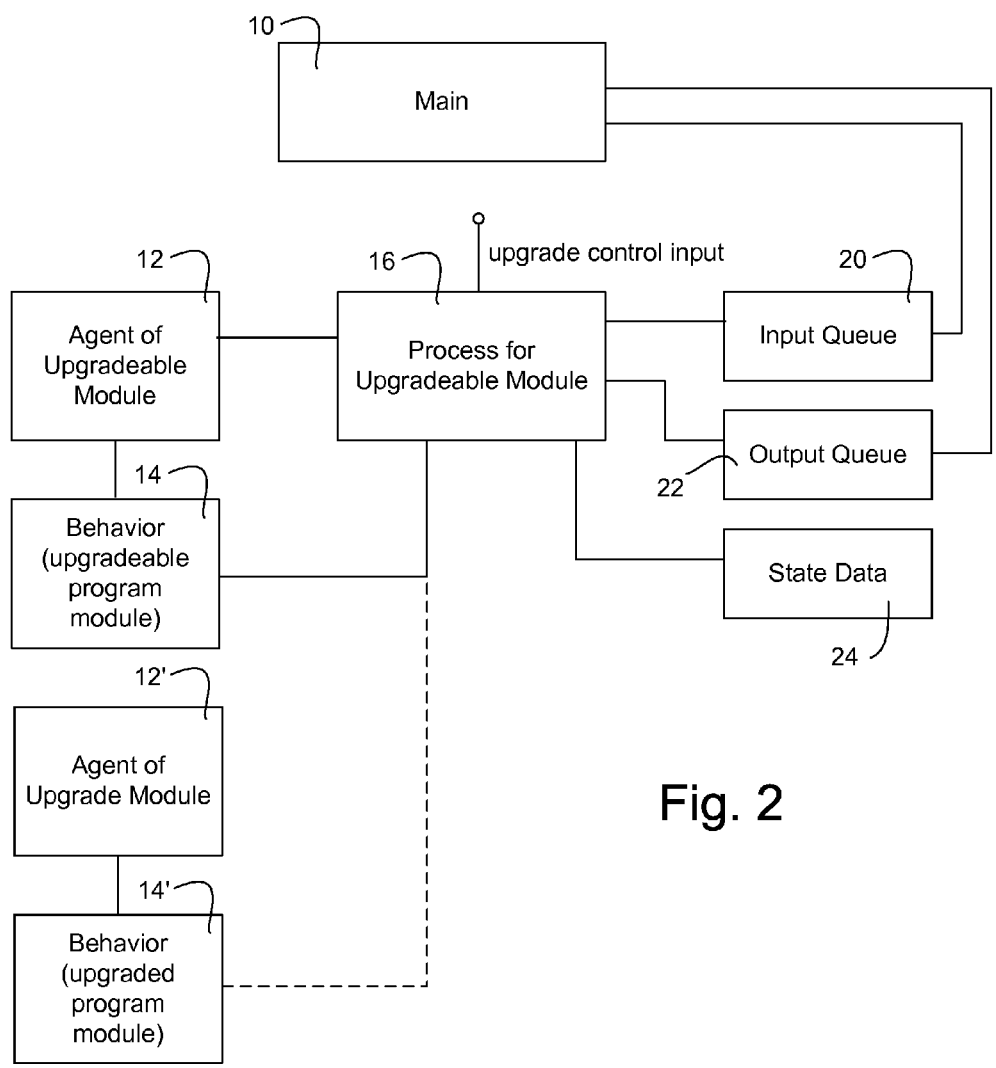
FIG. 2 is a schematic block diagram illustrating the software components of an embodiment.

FIG. 2 schematically illustrates a computer program 10 having an agent 12 that is connected to objects of the program through input queues 20 and output queues 22 that belong to a process 16. The agent has a behavior 14 that defines the regular operation of the agent. The behavior 14 accesses state data 24 that belongs to the process 16. The state data 24 could be contained in a different object, however, it is convenient to keep it in the process object 16.

A queue is a communication method in which the action of writing messages and reading messages are decoupled from each other and are thread safe. The writers and the readers to a queue are not necessarily on the same thread or in the same computer address space or the same computer. The use of queues to connect the process object to other objects thus facilitates operation in a multi-thread, multitasking environment.

A process object can have one or more outputs. An output is a collection of references to input queues of other objects. A collection is a grouping of some variable number of data items (possibly zero) that have some shared significance to the problem being solved and need to be operated upon together in some controlled fashion. Generally, the data items will be of the same type or, in languages supporting inheritance, derived from some common ancestor type.

The agent 12 can be upgraded while software 10 is in service by installing an upgraded object 12',14' that uses the existing process 16. When the agent 12 and its behavior 14 are idle, the upgraded agent 12' and its behavior 14' can be connected to the existing process 16, and the agent 12 and behavior 14 can be disconnected from process 16. When no longer connected, objects 12 and 14 can be cleaned up and removed from program memory.

The objects in computer program 10 that are connected to input queue 20 remain connected to that queue, and will not notice a temporary unavailability of the agent 12 while the upgrade process takes place. Likewise, the output queues 22 maintains their connections to objects in program 10 without change during the upgrade process.

The cutover from the behavior 14 to the upgraded behavior 14' is very simple and involves little time. This is important in a time sensitive environment, such as in the case of a VMS system where it is important to avoid any loss of video frames or any other disruption in service.

The initialization of the upgrade object 12' and its behavior 14' can involve processing the state data 24 to restructure it according to the needs of the upgraded behavior 14'. Typically, the amount of restructuring is small, as most upgraded software will use the same data.

In the embodiment of FIG. 2, the state data is part of the process object 16. The state data can be located in a different object than the process object 16, although this will require an extra connection and disconnection to be done when performing the upgrade. It is also possible to have the new agent 12' copy the state data from the original agent 12, and while this consumes time to copy the state data 24 at the time of upgrade, it may still be viable depending on the application. The advantage of maintaining the input queues 20 of process 16 connected to and available for other objects of the program 10 while replacing the behavior 14 will remain.

Figure 3:
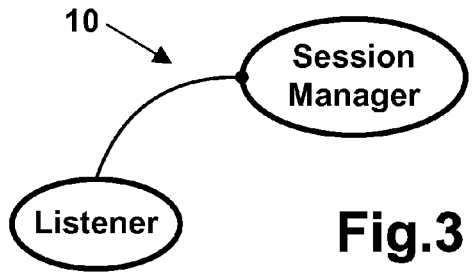
FIG. 3 is a diagram of an idle VMS session manager.

As illustrated in FIG. 3, the computer software 10 running on the server includes session manager and listener objects or agents. FIG. 3 illustrates the VMS session management server in an idle state. The listener receives requests from user stations 36 for a connection to a video camera stream 32. When such a request is detected, the session manager handles the request. For example, the session manager can be used to confirm that the user is authorized to have access to the camera 32, and then it can determine if the camera is already been assigned to a session agent. Assuming the camera 32 is idle, the session manager will create a session agent 12, a user agent 36' and a camera agent 32'. The user agent 36' will interface with the user monitoring workstation 36, and the camera agent 32' will interface with the camera 32. The session manager will link the user agent 36' to the camera agent 32'. The session manager will add the session to its lists of active sessions. The system now has five agents as shown in FIG. 4.

While the software 10 need not split the task of listening and session management into two objects, it will be appreciated that breaking down the software into specific tasks can improve the stability of the software in a demanding multitasking environment. Likewise, the creation of a user agent and a camera agent for the connection helps break down the tasks involved.

The session agent 12 will send command instructions instructing the camera agent 32' to begin streaming the video on a specific data channel and will instruct the user's application program 36 through the user agent 36' to begin decoding and rendering the video that is now being streamed on that specific data channel. If the user wishes to make changes to the video such as adjusting the resolution or changing the camera's pan, tilt or zoom (PTZ), the user agent 36' receives these requests from the user's application program 36 and sends the request to the session agent 12. The session agent 12 then decides if it will honor the request and if so, forwards it to the camera agent 32'. If not, it returns an error message to the user agent 36' that will send it to the user application 36.

Figure 4:
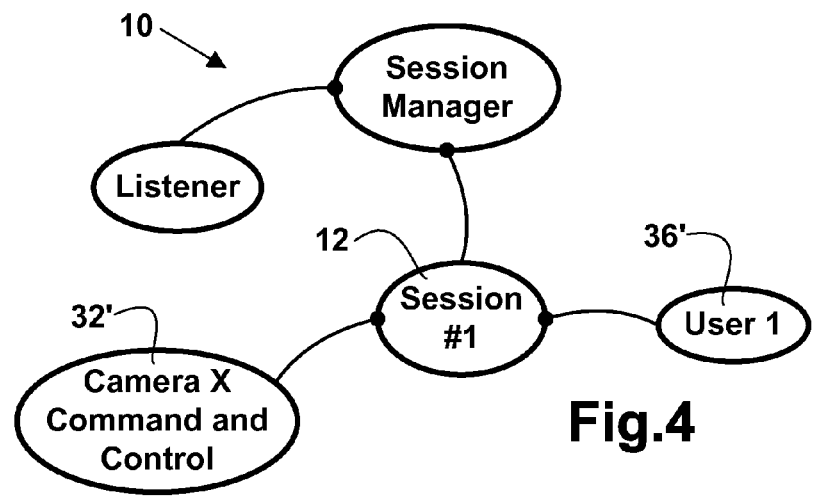
FIG. 4 is a diagram of a VMS session manager having one session agent connecting one user to one camera.

As shown in FIG. 4, the session manager does not handle the session for the camera that the user requested, but instead, it creates an agent 12 for the session. Creating a session agent 12 can be done using a class factory or other tools depending on the framework or runtime environment. The task given to this separate agent 12 is to handle the connection between the user interface 36 and camera 32. When the user 36 disconnects from the camera 32, the session comes to an end and the agent 12 will be closed and cleaned up.

Figure 5:
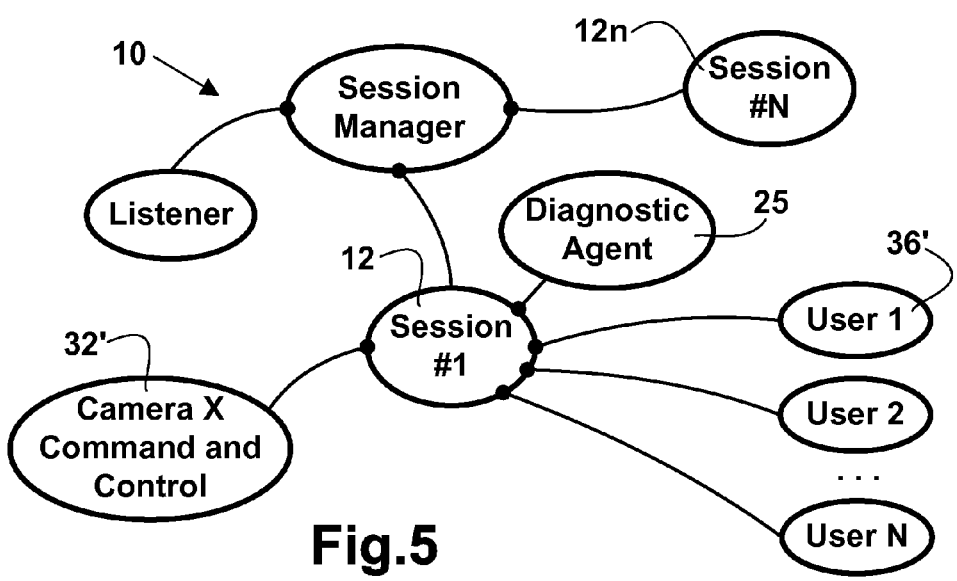
FIG. 5 is a diagram similar to FIG. 4 in which multiple users are connected to session agent 1 and showing the addition of a further session agent.

When other users wish to connect to the camera 32, the session manager can assign to agent 12 the connection to the new user. The agent 12 will then manage the priority of the users for controlling the camera. It is up to the session agent to arbitrate between conflicting requests that may come from the different users. For example, a more privileged user may be controlling the pan-tilt-zoom of the camera, thus locking out less privileged users from making such PTZ requests and by sending notifications to the other users that PTZ control is attributed to a specific user. This is illustrated in FIG. 5. When users wish to connect to a further camera, the session manager creates another session agent 12*n* to handle that camera session.

As mentioned above, it would be possible to upgrade the behavior of agent 12 for any new sessions created. This could be done without affecting any agent 12 in service. However, when the agent 12 is connected to a number of users, as illustrated in FIG. 5, it may be some time before all users stop their session with the camera 32. In a hosted environment where the session manager might be managing the sessions of unrelated tenants, the urgency of upgrading the functionality of the agents might not be the same for all the tenants. In such situations the ability to perform a live in service upgrade is invaluable.

Figure 6:
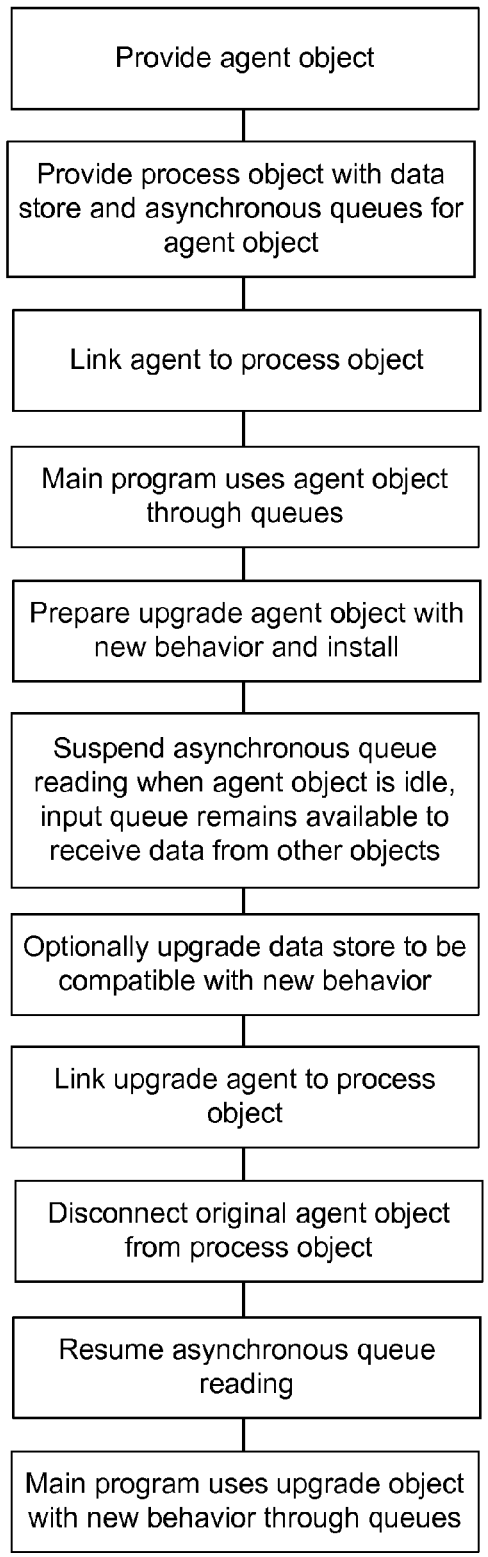
FIG. 6 is a sequence diagram illustrating steps involved in the embodiment of FIG. 2.

The in-service upgrade process can follow sequence illustrated in FIG. 6. The session agent 12, or any other agent to be upgraded, is provided with its process object and behavior 14 as illustrated in FIG. 2. The process object 16 is linked to the agent object 12 and to the behavior 14. The connections to the camera agent 32' and to the user agent 36' are done through queues 20 and 22. The other objects connect to agent 12 through these queues. When a need to upgrade the behavior of the agent 12 arises, a new behavior is coded. A class factory can be used in installing the new agent 12'. When the agent 12 is idle, and while video is streaming between cameras and users, camera control or user connection requests will be queued in queue 20 while the agent object 12' and its behavior are connected to process object 16. When initializing the object 12', the data store 24 can have new variables created or old variable modified, as required. For those variables that have not changed, the data in store 24 remains without processing required.

The new behavior 14' and agent object 12' are now linked to process 16 while the behavior 14 and agent object 12 can be cleaned up. The process 16 can continue operation of reading the queues 20 from the other agents and thus handle the requests for camera control and connections in accordance with the new behavior.

Figure 7:
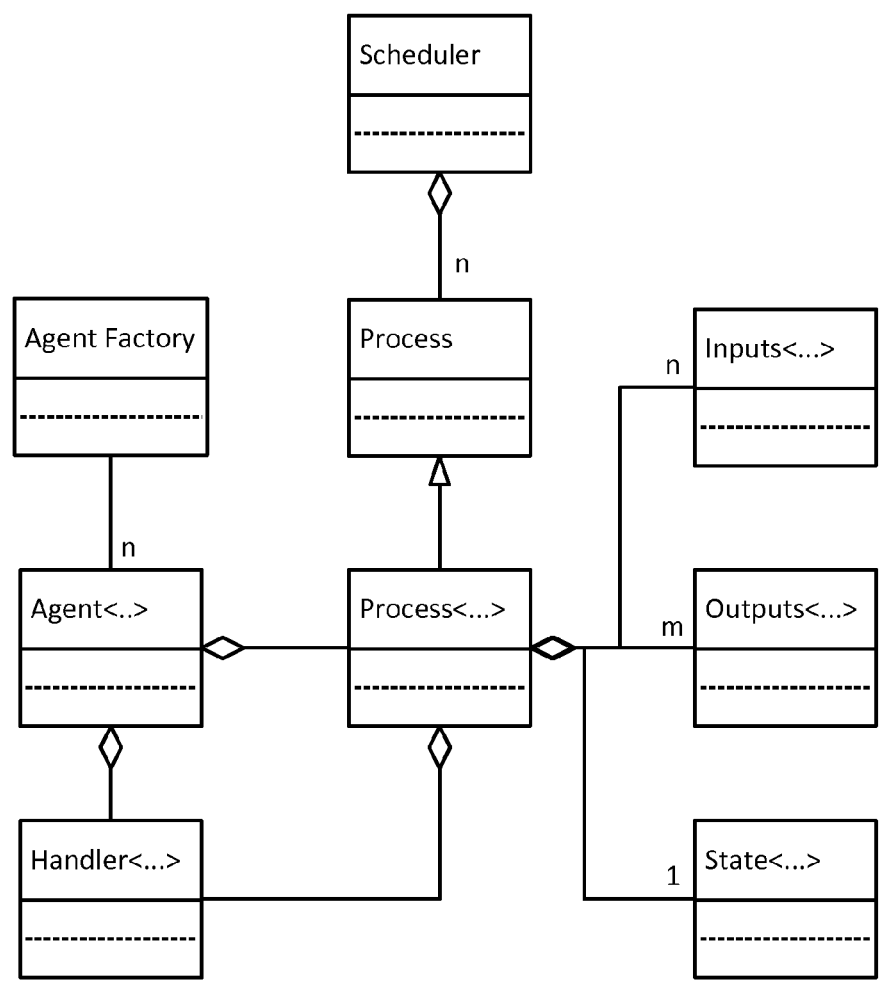
FIG. 7 is an object diagram illustrating objects representing software including an in-service upgrade object according to an embodiment.

The following describes, according to an embodiment, the Classes participating in the in-service upgrade method including the use of an agent factory. An object diagram of this embodiment is shown in FIG. 7.

The Agent Factory creates Agents. When first loaded, the modules (DLLs or EXEs) register their Agent Classes with the Agent Factory before the Agent Factory is able to create instances of Agent Classes. Using the indirect method of an Agent Factory to create instances of Agent Classes instead of the application code directly creating instances of Agent Classes enables the Agent Factory to determine at runtime which version of an Agent Class is instantiated instead of hard coding this decision at compile time. So the application, after running for a while, could load a new module which contains an upgraded version of an Agent Class. All subsequent Agent Creation Requests to the Agent Factory will create an instance of the Upgraded Agent Class.

The Process is the base class for all the strongly-typed Process< . . . > classes. It implements all the common logic around process creation, destruction, system signals such as "terminate", unhandled exception processing, agent failure processing and interfacing with the Scheduler.

The Scheduler is responsible for activating Processes with messages in their input queues ready for processing by the Agents. In this case, the framework has a scheduler function separate from the operating system's scheduler to help manage threads in the software.

The Process<...> is strongly-typed class derived from the Process Class. The Process<...> owns the strongly-typed Input Queues, the strongly-typed Output Queues and the strongly-typed State data structure. It also holds a reference to the Agent's strongly-typed Handler interface. When the Process is activated because a message was received on one of the input queues, it calls the corresponding method in the Handler class.

The Inputs<...> are message queues. Other Agents can post strongly-typed messages asynchronously to the Inputs. Any number of Agents can post messages to any one of the Inputs<...>.

The Outputs<...> are references to zero or more Inputs<...> belonging to other agents. When the Agent posts a message to an Output<...>, the message is posted to all of the input queues that have been bound to the given output. The Agent posting to the output has no knowledge of the recipient nor how many recipients will receive the message.

The State<...> data structure is the strongly-typed repository for the Agent instance runtime data. This data structure is private to the Agent. The State<...> instance is bound to the Process<...> and not the Agent<...> so one can update the Agent<...> and pass on the State<...> to the updated Agent<...>.

The Handler<...> is a strongly-typed Interface (does not have any data storage) that implements the behavior of the Agent. The Handler<...> has one method corresponding to each input queue. When a message arrives on a given input queue, the corresponding handler method is called with the received message as parameter. The handler also has two additional functions Initialize and Finalized which are called only once. Initialized is called after the Agent's creation but before its activation to initialize the State data. Finalize is called once after the Agent's deactivation to Dispose of resources stored in the State data.

The Agent <...> is a strongly-typed wrapper for the Handler<...>. It holds the reference to the Process<...> object from which the Handler<...> can access the State<...> and Outputs<...>.

The following sample program code illustrates one implementation of the in-service upgrade.

Sample Program Code

```
Basic Agent
// Integer Constants used to identify the Agent. Each of the Agents in the sample will
use a different identifier to be able to distinguish them from each other.
let [<Literal>] BASIC_AGENT = 1
let [<Literal>] UPGRADED_BASIC_AGENT = 2
let [<Literal>] DYNAMICALLY_LOADED_AGENT = 3
// ----------------------------------------------------------------------
type BasicAgentState = {
    Count: int
}
with
    static member Initial = {
        Count =1
    }
//Cleanup method for the State. In this case there is nothing to do.
    member x.Final = ( )
//State object has a handy function to update a state variable and return a copy of the
new state object.
    member x.Next ={x with Count = x.Count +1}
// ----------------------------------------------------------------------
// Agent constructor code: Agent receives the process as a construction parameter, thus
linking the Agent to the process. The second step is to link the Process to the Agent.
This is accomplished in the second line by setting the Process' ICcrHandler pointer to
Agent.
type BasicAgent (proc : CcrProcess<_,_,_>) as self =
    // This single assignment completes the upgrade in one step. Any new message put
on the message queues, will be passed to the new ICcrHander instead of the old
ICcrHandler
    do proc.ICcr Handler <- self
    member x.Proc = proc
    interface ICcrHandler<int, OutputPorts<int*int*int>, BasicAgentState> with
//When first activated, the agent initialized its state.
        member x.Initial ( ) = proc.State <- BasicAgentState.Initial
//Just before destruction, the Agent releases all resources back to the operating system
(such as closing files and releasing network connections). The Final method will be
called either upon normal termination of the Agent or during cleanup after an
unhandled exception caused catastrophic failure of the Agent.
        member x.Final ( ) = proc.State.Final
// The output of the Agent consists on posting a simple triplet whose elements are 1)
An integer indicating the version of Agent, 2) The current message count stored in the
state, and 3) Echo back the integer message received from the input queue.
        member x.HO message = ccr {
            printfn "BasicAgent: %d" message
            proc.Output.P0.Post (BASIC_AGENT, proc.State.Count, message)
            proc.State <- proc.State.Next
        }
Upgraded agent
// ----------------------------------------------------------------------
```

```
type UpgradedBasicAgent (proc : CcrProcess<_,_,_>) as self =
    // The Upgraded Agent is a child object of the Basic Agent so it shares the same type
signature. In a strongly typed language, inheritances ensures that the Upgraded Agent
is so similar to the Basic Agent that it can substitute for the Basic Agent.
    inherit BasicAgent (proc)
    do proc.ICcrHandler <- self
    member x.Proc = proc
//Argument is the type signature of this agent: one input queue of integers, one output
queue accepting a triplet of integers, and the Agent's State signature.
    interface ICcrHandler<int, OutputPorts<int*int*int>, BasicAgentState> with
//Initalization will not be called if the Agent is being upgraded. In the case of an
upgrade the Upgraded Agent gets the state as it was last set by the previous version
Agent.
    member x.Initial ( ) = proc.State <- BasicAgentState.Initial
    member x.Final ( ) = proc.State.Final
    member x.H0 message = ccr {
        do! Wait (TimeSpan.FromMilliseconds 25.)
        printfn "U pgradedBasicAgent: %d" message
//Upgraded Agent uses a different identifier, and after the upgrade, the count will be
where the previous agent left it
        proc.Output.P0.Post (UPGRADED_BASIC_AGENT, proc.State.Count, message)
        proc.State <- proc.State.Next
    }
Dynamically Upgraded Agent
// --------------------------------------------------------------------------------
// For demonstration purposes, this agent is defined in a different module then the
previous agents. In fact, this DLL is compiled after the DLL of the Basic agent to
demonstrate upgrading the application after the original DLL was put in service.
type DynamicallyLoadedAgent (proc : CcrProcess<_,_,_>) as self =
    inherit BasicAgent (proc)
//This step performs the upgrade by changing the Process' behavior pointer to that of
this (Dynamically Upgraded) agent.
    do proc.ICcrHandler <- self
    member x.Proc = proc
interface ICcrHandler<int, OutputPorts<int*int*int>, BasicAgentState> with
    member x.Initial ( ) = proc.State <- BasicAgentState.Initial
    member x.Final ( ) = proc.State.Final
    member x.H0 message = ccr {
        do! Wait (TimeSpan.FromMilliseconds 25.0)
        printfn "DynamicallyLoadedAgent: %d" message
        proc.Output.P0.Post (DYNAMICALLY_LOADED_AGENT, proc.State.Count,
message)
        proc.State <- proc.State.Next
    }
Creation and in service upgrade of Agents defined in the same module
// --------------------------------------------------------------------------------
[<TestClass>]
type Test ( ) =
    // --------------------------------------------------------------------------------
    /// Upgrade a running agent.
    [<TestMethod>]
    member x."InServiceUpgradeDemo: 1 - Basic upgrade of running agent" ( ) =
        let maxcount =10
        // Setup two synchronous queue to receive input from Agent and from System.
        use tracer = new SyncObserver<_>(maxcount)
        use systemMonitor = new SyncObserver<_>(maxcount)
        // Register the BasicAgent with Agent Factory
        CcrProcess.AgentFactory
            .RegisterType<BasicAgent, BasicAgent>( )
            .EndMethodChain
        // Create the BasicAgent
        let basic = CcrProcess.AgentFactory.Resolve<BasicAgent>( )
        Assert.IsInstanceOfType (basic, typeof<BasicAgent>)
        // Wire up agent.
        /1 Link the System's Monitor Output to the test input queue 'systemMonitor'.
        CcrProcess.SystemMonitor >>= systemMonitor
        // Link the Agent's output to the tracer input queue.
        basic.Proc.Output.P0 >>= tracer
        // Start test
        let timespan =TimeSpan.FromMilliseconds 100.0
        // Activate the Agent. This tells the scheduler to wake up the agent if any messages
are queued and ready to be processed.
        CcrProcess.Spawn basic.Proc
        // Send the integer message '222' to the agent by posting it on its input queue.
        basic.Proc.Input.P0.Post 222
        // Check that the Basic Agent returned a triplet with the proper agent identifier
(BASIC_AGENT), that this is message #1 and that it echoed back our integer message
'222'
        Assert.AreEqual ((BASIC_AGENT, 1, 222), tracer.WaitForMessage timespan)
        // Register the new upgraded class with Unity
```

```
    CcrProcess.AgentFactory
        .RegisterType<BasicAgent, UpgradedBasicAgent>( )
        .EndMethodChain
    // Upgrade the BasicAgent to UpgradedBasicAgent
    // Create the Upgraded Agent and upgrade the Basic Agent by doing so link it to the
Process that was previously linked to the Basic Agent.
    let upgraded = CcrProcess.AgentFactory.Upgrade<BasicAgent>(basic.Proc)
    // Send the integer message '333' to the what we think is the Basic Agent (it has
been upgraded unbeknownst to us).
    basic.Proc.Input.P0.Post 333
    // Verify that the upgrade occurred.
    Assert.IsInstanceOfType (basic.Proc.ICcrHandler, typeof<UpgradedBasicAgent>)
    // Verify that the return message form the agent now uses the new Agent Id
(UPGRADED_BASIC_AGENT), that this is message #2 and that it echoed back our integer
message '333'
    Assert.AreEqual ((UPGRADED_BASIC_AGENT, 2, 333), tracer.WaitForMessage
timespan)
    // No unhandled exceptions
    // Check that there were no unhandled failures.
    Assert.IsTrue (systemMonitor.WaitForNothing (TimeSpan.FromSeconds 0.5))
Dynamically Upgraded Agent
// ---------------------------------------------------------------------------------
// Upgrade the basic agent with one dynamically loaded form a DLL.
[<TestMethod>]
member x."InServiceUpgradeDemo: 2 - Dynamically Loaded upgrade of agent"( ) =
    let maxcount = 10
    // Setup queues to receive messages from the agents.
    use tracer = new SyncObserver<_>(maxcount)
    use systemMonitor = new SyncObserver<_>(maxcount)
    // Register the BasicAgent with Agent Factory
    CcrProcess.AgentFactory
        .RegisterType<BasicAgent, BasicAgent>( )
        .EndMethodChain
    // Create the BasicAgent
    let basic = CcrProcess.AgentFactory.Resolve<BasicAgent>( )
    Assert.IsInstanceOfType (basic, typeof<BasicAgent>)
    // Wire up agent.
    // Wire up the System Monitor's Unhandled Exceptions to our input queue.
    CcrProcess.SystemMonitor >>= systemMonitor
    // Wire up the Agent's output to our queue.
    basic.Proc.Output.P0 >>= tracer
    // Start test
    let timespan = TimeSpan.FromMilliseconds 100.0
    // Start the Basic Agent.
    CcrProcess.Spawn basic.Proc
    // Sent an integer message '111' to the Agent
    basic.Proc.Input.P0.Post 111
    Assert.AreEqual ((BASIC_AGENT, 1, 111), tracer.WaitForMessage timespan)
    // Dynamically load the module CcrErlang.Test.Update and register the Agent
"DynamicallyLoadedAgent"
    CcrProcess.AgentFactory.RegisterFromProjectFilename "CcrErlang.Test.Update"
"CcrErlang.Test.Update.dll" "DynamicallyLoadedAgent"
    // Upgrade the running agent by only having a reference to its Process and its base
type.
    let proc = basic.Proc :> CcrProcess
    let agentBaseType = agentBaseTypeOfProc proc
    let upgraded = CcrProcess.AgentFactory.Upgrade (agentBaseType, proc)
    // Test upgraded agent
    // Send an integer message '444' to the upgraded agent.
    basic.Proc.Input.P0.Post 444
    // Verifty that the agent responsed with a new agent ID
(DYNAMICALLY_LOADED_AGENT), this is message #2 and that it echoed our integer
message '444'
    Assert.AreEqual ((DYNAMICALLY_LOADED_AGENT, 2, 444), tracer.WaitForMessage
timespan)
    // Verify that no unhandled exceptions occurred.
    Assert.IsTrue (systemMonitor.WaitForNothing (TimeSpan.FromSeconds 0.5))
    // No unhandled exceptions
```

It will be appreciated that the above-listed sample program code is but one example, and implementation can take a wide variety of forms.

One of the many applications for in-service-upgrades is in-service diagnostics and debugging. When designing an application it is usually impossible to fully anticipate the environment in which it will operate and hence it is usually impossible to instrument the code to anticipate every possible failure mode and to log information necessary to diagnose every possible failure mode. Furthermore, over-instrumenting the code with diagnostics results in performance penalties when in production. The common strategy is to instrument the code to record all failure modes and attempting to reproduce the failure outside the production environment after the fact. However, production environment failures are notoriously hard to reproduce in the test environment which are sanitized, under less resource constraints and are less dynamic.

Thus in-service upgrade can be used as a tool to be used to improve system reliability by using in-service upgrade of software to temporarily deploy tracing or other debugging or quality monitoring tools, so that an upgrade can be defined to improve reliability of a system. The behavior of an agent object, in the above embodiment, can be given diagnostic code to gather and store information related to its normal operation. This information can be, in part or wholly, analyzed by the diagnostic code, so that the results of the analysis done by the diagnostic code can be communicated to an operator or a debugging agent. Alternatively, the diagnostic agent can deliver raw data to the operator or debugging agent.

The diagnostic code in the upgraded agent can also allow the upgraded agent object to interact with debugging or diagnostic agents, illustrated in the embodiment of FIG. 5 as a diagnostic agent 25, that the agent object is not connected to in normal operation. The diagnostic agent 25 can be created and installed for the purpose of the diagnostic or debugging of agent object 12, or it can be an agent that waits for requests from any object or agent looking for assistance with diagnostics or debugging.

Thus the upgrade will result in new connections being established between the upgraded agent 12 and other objects. When the diagnostic work is done, the upgraded agent 12 can be upgraded again to either restore the previous behavior, or, if the operator or debugging agents have concluded that a behavior fix is warranted to resolve the original problem, then the behavior is changed over the original behavior, however, now without the diagnostic code. Thus, the memory and/or processing overhead of diagnostic function in the agent object 12 is only used when required. The agent object 12 is thus upgraded with this new behavior with the result that the diagnosis and repair of software system problem was carried out while avoiding service interruption.

Figure 8:
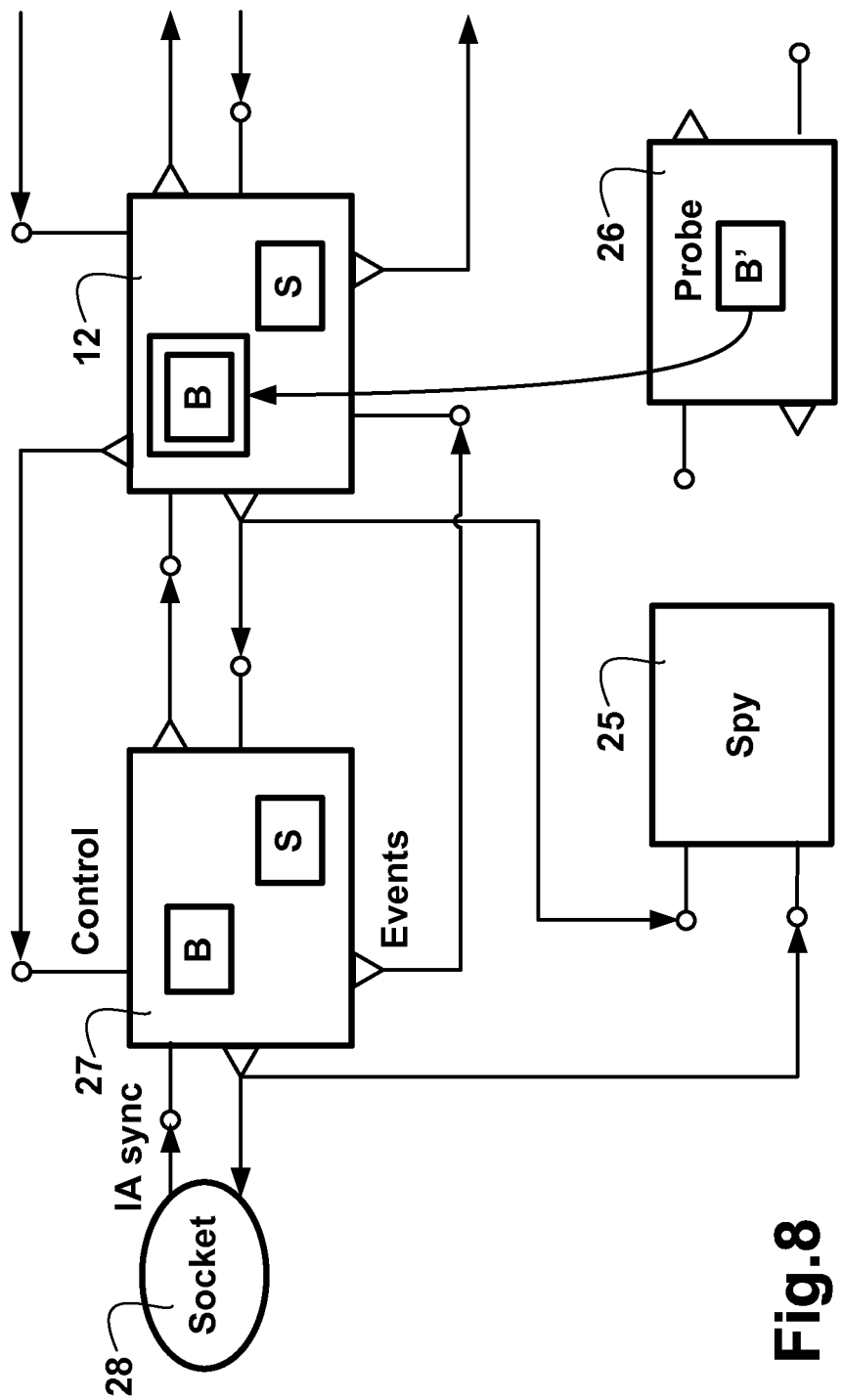
FIG. 8 is a diagram illustrating objects involved in an in-service upgrade for diagnostic purposes.

In the embodiment of FIG. 8, there is shown an agent 27 connected to a socket 28 with an agent 12 connected to agent 27. First, as the agent 12 sends a copy of its output messages to all the input queues of other agents in its output collections, a Spy Agent 25 can monitor the outputs of any agent by linking its inputs to the output collection of any agent in the system. Second, in-service upgrade can be used to replace the behavior of running agent 12 with that of a probe 26 which logs all input messages before passing them on to the agent 12 being probed and further can log the state changes that result from the processing of the input messages.

The probe 26 connects to the process of agent 12, and connects the behavior of agent 12 to the probe 26. In this way, the probe 26 "replaces" the behavior of agent 12. The probe 26 therefore takes over all connections of agent 12, and is able to intercept all messages coming in and out of agent 12 and access its data store. The probe 26 can record, filter and inject messages while recording snapshots of data from the data store as messages are processed by the agent 12. The probe 26 can work without ever requiring any change in the behavior of agent 12, and alternatively an in-service upgrade of agent 12 can be done to test a modified behavior while the probe is in place to monitor the effect of the modified behavior. When probe 26 is removed, the process of agent 12 is disconnected from probe 26 and connected to agent 12.

In-service upgrade can thus be used efficiently to instrument misbehaving code after it has been deployed in the production environment. Using these two techniques (namely deploying the spy 25 and the probe 26), it is possible to instrument code running in a production environment after the fact and hence gather specific information leading to the failure. Thereafter the probe 26 can be unloaded and an enhanced agent 12 can be designed to correct the faulty behavior and dynamically loaded into the production system without disruption of operations.

The agents 25 and 26 can be developed for general use in the software system, and created at runtime as required. While the in-service upgrade of agent 12 can be used alone for debugging or diagnostic purposes, it will be appreciated that agents 25 and 26 are useful tools for diagnostics.

What is claimed is:

1. A method for performing an upgrade of a software while in-service in a computer, the method comprising:
   providing a process object that manages at least one asynchronous input queue, is bound to at least one output queue collection and has a state data store;
   providing an original agent object linked to said process object, and having a behavior able to access said asynchronous input queue, said output queue collection and said state data store, said process object and said original agent object being configured to cause said original agent object to perform an action on data received in said asynchronous input queue, to provide output on said output queue collection and store data required for any future operation of said original agent object in said state data store, and to enter an idle state when finished an operation on data received in said asynchronous input queue;
   executing said software in said computer, said software interfacing with said original agent object using said queues of said process object;
   creating an upgrade agent object to replace said original agent object with an upgraded behavior, said upgrade agent object adapted to use said process object;
   installing said upgrade agent object without suspending execution of said software;
   when said original agent object is in said idle state:
     suspending reading data from said asynchronous input queue, while continuing to allow said asynchronous input queue to be available to other objects in said software;
     adjusting, if required, said state data to take into account any changes in data due to said upgrade agent object;
     causing said upgrade agent object to be linked to said process object and disconnecting said original agent object from said process object; and
     resuming operation of said process object and execution of said upgrade agent object.

2. The method as claimed in claim 1, wherein said at least one asynchronous input queue comprises a plurality of asynchronous input queues.

3. The method as claimed in claim 2, wherein:
   said executing software in said computer that interfaces with said original agent object using said queues of said process object comprises dynamically creating objects in said software linked to said queues of said process object while said original agent object is operating; and
   said resuming operation comprises said upgrade agent object continuing operation with connections to said dynamically created objects.

4. The method as claimed in claim 3, wherein said process object has an upgrade control input and in response to data received on said upgrade control input controls said suspending reading data from said asynchronous input queue and said adjusting, if required, said state data to take into account any changes in data due to said upgrade agent object.

5. The method as claimed in claim 4, wherein said software is executed in a multi-tasking operating system in which a scheduler manages multiple threads of execution of said objects.

6. The method as claimed in claim 1, wherein said original agent object and said upgrade agent object are created using a class factory.

7. The method as claimed in claim 1, wherein a software framework is used to create said upgrade agent object when said computer is executing said software, said framework causing said upgrade agent object to be linked to said process object and disconnecting said original agent object from said process object.

8. The method as claimed in claim 1, wherein said queues pass data that is strongly-typed.

9. The method as claimed in claim 1, wherein data in said state data store is strongly-typed.

10. The method as claimed in claim 1, wherein said upgraded behavior includes diagnostic functions.

11. The method as claimed in claim 10, further comprising replacing said upgrade agent object with a subsequent upgrade agent object having a behavior not including diagnostic functions.

12. A computer system having a processor configured to perform an upgrade of software while in-service, the system comprising:
 a process object stored in memory that manages at least one asynchronous input queue, is bound to at least one output queue collection and has a state data store;
 an upgradeable original agent object linked to said process object, and having a behavior able to access said asynchronous input queue, said output queue collection and said state data store, said process object and said upgradable original agent object being configured to cause said upgradable original agent object to perform an action on data received in said asynchronous input queue, to provide output on said output queue collection and store data required for any future operation of said upgradable original agent object in said state data store, and to enter an idle state when finished an operation on data received in said asynchronous input queue;
 a plurality of objects configured to interface with said upgradeable original agent object using said queues of said process object;
 said software being executable in said computer, said software being adapted to interface with said upgradable original agent object using said queues of said process object;
 said upgradable original agent object being replaceable by creating and installing an upgrade agent object with an upgraded behavior, when said upgradable original agent object is in said idle state without suspending execution of said software, said upgrade agent object being adapted to use said process object;
 said process object being adapted to suspend reading data from said asynchronous input queue, while continuing to allow said asynchronous input queue to be available to other objects in said software, during the upgrade of said software;
 said process object being adapted to adjust, if required, said state data to take into account any changes in data due to said upgrade agent object, during the upgrade of said software;
 said process object being adapted to be linked to said upgrade agent object and said upgradable original agent object being adapted to be disconnected from said process object, during the upgrade of said software; and
 said process object being adapted to be resumed and said upgrade agent object being adapted to be executed following the upgrade of said software.

13. A method for performing an upgrade of software while in-service in a computer connected via a network to other network devices, said software comprising a plurality of objects, the method comprising:
 providing a process object in said software that manages at least one asynchronous input queue in said software, is bound to at least one output queue collection in said software and has a state data store in said software;
 providing an original agent object in said software, said original agent object being linked to said process object, and having a behavior able to access said asynchronous input queue, said output queue collection and said state data store, said process object and said original agent object being configured to cause said original agent object to perform an action on data received in said asynchronous input queue, to provide output on said output queue collection and store data required for any future operation of said original agent object in said state data store, and to enter an idle state when finished an operation on data received in said asynchronous input queue;
 executing said software in said computer, said software interfacing with said original agent object using said queues of said process object;
 creating an upgrade agent object in said software to replace said original agent object with an upgraded behavior, said upgrade agent object adapted to use said process object;
 installing said upgrade agent object without suspending execution of said software;
  when said original agent object is in said idle state:
   suspending reading data from said asynchronous input queue, while continuing to allow said asynchronous input queue to be available to other objects in said software, wherein other objects of said software are able to process data and communicate with said other network devices;
   adjusting, if required, said state data to take into account any changes in data due to said upgrade agent object;
   causing said upgrade agent object to be linked to said process object and disconnecting said original agent object from said process object; and
   resuming operation of said process object and execution of said upgrade agent object.

* * * * *